United States Patent [19]
Ofer et al.

[11] Patent Number: 5,973,690
[45] Date of Patent: Oct. 26, 1999

[54] FRONT END/BACK END DEVICE VISUALIZATION AND MANIPULATION

[75] Inventors: Erez Ofer, Brookline; Joseph Murphy, Westwood, both of Mass.

[73] Assignee: EMC Corporation, Hopkinton, Mass.

[21] Appl. No.: 08/966,345

[22] Filed: Nov. 7, 1997

[51] Int. Cl.⁶ .................................................. G06F 15/00
[52] U.S. Cl. ............................................. 345/340; 345/336
[58] Field of Search ......................................... 345/340, 348, 345/349, 333, 334, 335, 326–332, 336, 337, 338, 339, 341–342, 343–345, 347, 346, 350–356, 112–113, 115, 133, 141; 707/10

[56] References Cited

U.S. PATENT DOCUMENTS

| | | | |
|---|---|---|---|
| 5,428,782 | 6/1995 | White | 395/671 |
| 5,487,172 | 1/1996 | Hyatt | 395/800.32 |
| 5,495,607 | 2/1996 | Pisello et al. | 707/10 |
| 5,619,709 | 4/1997 | Caid | 707/532 |
| 5,694,601 | 12/1997 | White | 395/671 |
| 5,754,845 | 5/1998 | White | 707/10 |
| 5,819,089 | 10/1998 | White | 395/676 |
| 5,838,317 | 11/1998 | Boluick et al. | 345/339 |
| 5,838,319 | 11/1998 | Gzbak et al. | 345/340 |
| 5,844,553 | 12/1998 | Hao et al. | 345/329 |

OTHER PUBLICATIONS

Simpson, *Windows 95 Unlet*, ID 6 Books Worldwide, Inc. Foster City, CA, chg. 10–11, 1995.

*Primary Examiner*—Steven P. Sax
*Attorney, Agent, or Firm*—Fish & Richardson P.C.

[57] ABSTRACT

The invention relates to a method for displaying, for an array of storage elements, logical devices stored on the storage elements in which each element stores at least one logical device accessible to at least one host processor through a storage element controller, in particular a disk drive controller. In accordance with the invention, a host processor operates to visually display, in a first window of the host processor-controlled display monitor, a first mapping identifying for each controller host port at least the logical volumes available at said port. The system then visually displays in a second window of the monitor a second mapping identifying, for each controller storage port, the logical devices stored on the storage element attached to the controller storage port. The system then enables the user to highlight, at least, in the second window, for any selected host port identified in the first window, all of the logical devices accessible from the host port. In other aspects, the system allows the user to highlight any of the identified elements being displayed to provide a correspondence in the first and second windows so that views from the host port side and from the storage element side can be simultaneously displayed and highlighted.

10 Claims, 4 Drawing Sheets

FIGURE 4

| HOST ADAPTOR CONFIGURATION ||||||||| DISK ADAPTOR CONFIGURATION ||||||||
| HOST | ADAPTOR NO./PORT | TARGET ADDRESS NUMBER LOGICAL DEVICE NUMBER ||||||| DISK ADAPTOR | PORT 126 | DEVICE NUMBER PROTECTION |||||||
|---|---|---|---|---|---|---|---|---|---|---|---|---|---|---|---|---|
| HP5 | 01/00 | 10 | 20 | 30 | | | | | 02 | C | 00 HS | 01 HS | 02 HS | | | | |
| SUN7 | 01/01 | 00 | 01 | 02 | 03 | 04 | 05 | | 02 | D | 18 M1 | 1A M1 | 02 NP | 08 NP | 0E NP | | |
| AIX14 | 01/02 | 0C | 0D | 0E | 0F | 10 | 11 | 12 | 02 | E | 19 M1 | 1B M1 | 03 NP | 09 NP | 0F NP | | |
| --- | 01/03 | 18 | 01 | 02 | 03 | 04 | 05 | | 02 | F | 15 M1 | 16 17 M1 M1 | 04 0A NP NP | 1C NP | | | |
| HP5 | 05/00 | 00 | 01 | 02 | | | | | 03 | C | 03 | 04 HS | 05 HS | | | | |
| SUN7 | 05/01 | 0C | 0D | 0E | 03 | 04 | 05 | | 03 | D | HS | 1A | 1F | 20 NP | 21 | | |
| AIX14 | 05/02 | 00 | 01 | 02 | 0F | 10 | 11 | | 03 | E | 18 M3 | 1B M3 | 1F M3 | 20 M3 | 21 M3 | | |
| DEC3 | 05/03 | 0B | 1D | 02 | | | | | 03 | F | 15 M3 | 16 M3 | 17 M3 | 1C M3 | 1D M3 | 1E M3 | |
| HP12 | 12/00 | 00 | 01 | 02 | | | | | 14 | C | 1C R | 1D R | 1E R | 01 | 07 | 0D | |
| HP12 | 12/01 | 06 | 07 | 08 | | | | | 14 | D | R | R | R | NP | NP | NP | |
| --- | 12/02 | 10 | 20 | 30 | | | | | 14 | E | 1F R | 20 R | 21 R | 19 M4 | 1A M4 | 1B M4 | |
| AIX14 | 12/03 | 12 | 13 | 14 | | | | | 14 | F | 22 R | 23 R | 24 R | M4 | 18 M4 | M4 | |
| AIX14 | 16/00 | 11 | 12 | 13 | | | | | 15 | C | 25 R | 26 R | 27 R | 05 | 0B | 11 | |
| --- | 16/01 | 09 | 0A | 0B | | | | | 15 | D | R | R | R | NP | NP | NP | |
| SUN7 | 16/02 | 00 | 01 | 02 | | | | | 15 | E | 28 R | 29 R | 2A R | 15 M2 | 16 M2 | 17 M2 | |
| SUN7 | 16/03 | 2C | 2D | | | | | | 15 | F | 2B R | 2C R | 2D R | 18 M2 | 1A M2 | 1B M2 | 12 13 14 M2 M2 M2 |

FRONT END/BACK END DEVICE VISUALIZATION AND MANIPULATION

BACKGROUND OF THE INVENTION

The invention relates generally to mass storage systems, and in particular, to visualization of logical volumes at the host front end and storage back end of a mass storage controller.

To meet the growing data storage needs of today's computer systems, and, simultaneously to enable more than one computer processor to access the same stored data, disk drive controllers have been configured to have two or more independent storage ports, that is, two or more ports through which different computer processors (host computers) can access the same mass storage device(s). The mass storage device(s) can be one or preferably, a plurality, of disk drives configured in accordance with a predetermined or selectable structure.

In a typical disk drive system, large disk drive memories are typically divided into a plurality of logical volumes. Thus, a single disk drive can have 4, 8, or more logical volumes. In addition, each of the logical volumes can be accessed by plural host computers. Thus, for example, one host computer may be responsible for writing and maintaining a database in a first logical volume on the disk drive and other host computers ordinarily only expect to read the database for their varying purposes and applications. Other host computers may be responsible for yet other logical volumes.

In addition, various logical volumes may be protected in different ways. Thus groups of logical volumes may be written in accordance with a RAID (redundant array of independent disks) protocol, an n-way mirrored protocol such as that used in the EMC Symmetrix® system, or the logical volume may not be protected at all. When a logical volume is protected, it is typically written to different disk drives. This is all performed transparently to the host computer or processor, which identifies the logical volume with its own designation. The disk drive controller system, may, however, employ different identifications for each of the logical volumes and transparently access the data as requested by the host computer, in accordance with an internal protocol being used for the logical volume. Internally, the logical volumes are often referred to as logical devices to distinguish between a host designation and a controller assigned designation.

In any case, the host computers are not aware of which disk drive or disk drives store the data, which is being sent to or retrieved from the mass storage system. Thus, it may occur by chance or happenstance that the load balance to the disk drives is poor, which can result in substantial delays and slower throughput as some channels become clogged while others remain relatively free.

At present, various tools exist which enable a user to identify which host designated logical volumes are written at which host ports of the controller, and which device logical volumes (or logical devices) are identified at the various disk ports of the storage controller. This information has been typically available as raw data to the maintenance engineers, not to the users, and even when available to the user, was presented in such a poor manner that the user, with only great difficulty, if at all, through manual manipulation, would have a clear understanding of the load balancing or other distribution of the logical volumes between various host ports and the disk drive storage elements.

SUMMARY OF THE INVENTION

The invention thus relates to a method for visually presenting the correspondence of the host generated logical volumes stored on an array of storage elements, each of the storage elements storing at least one logical volume accessible to at least one host processor through a storage element controller. The method of the invention features the steps of visually displaying, in a first window portion of a host processor-controlled display monitor, a first mapping which identifies for each controller host port at least the logical volumes available to the port. The method further features the step of visually displaying, in a second window portion of the host processor-controlled display monitor, a second mapping for identifying, for each controller storage port, logical devices stored on the storage element(s) attached to the controller storage port. The method further features highlighting, in at least the second window, for any user-selected host port identified in the first window, all logical devices accessible from the selected host port.

The method of the invention further, in particular embodiments, features displaying for each host port in the first window, an identification of the host processor connected to each respective host port. In another aspect of the invention, the controller has a plurality of host adaptors, each adaptor having a plurality of said host ports, and a plurality of storage element adaptors, each storage element adaptor having a plurality of the storage ports. The method then further features visually displaying in the first window, in association with a host port, the host adaptor containing the host port and displaying in a second window, in association with a storage port, the storage adaptor containing the storage port.

In yet another aspect of the invention, the method features displaying, in the second window, in association with each logical volume entry, a protection level associated with the entry. In this aspect, the step of selecting a particular protection level associated with a particular logical volume causes the other related logical devices associated with that protection mechanism (the mirrored volumes, for example) to be highlighted.

In yet another aspect of the invention, the method further features reassigning logical devices at the host adaptors from one storage element to another storage element, based upon the highlighting step, to better balance access to, and the load of data being read and/or written to, the storage elements.

Advantageously, then, the method provides a simple and easy visual display correlating two separate views into the storage controller, one view from the host side (the front end) and a second view from the mass storage side (the back end). Advantageously this enables a visual understanding of the locations of various logical volumes and devices, originally transparent to the host, to be seen upon proper selection and identification of the selections being highlighted. In particular, this invention also advantageously enables a visual analysis of the data communications loading of the mass memory, based upon data being read or written from one host computer across an array of storage elements in order to improve both throughput and response time for the mass storage controller controlled system.

BRIEF DESCRIPTION OF THE DRAWINGS

Other features and advantages of the invention will be apparent from the following figures in which:

FIG. 4 is a diagram illustrating the various windows useful in accordance with the invention.

DESCRIPTION OF A PREFERRED PARTICULAR EMBODIMENT

Figure 1:
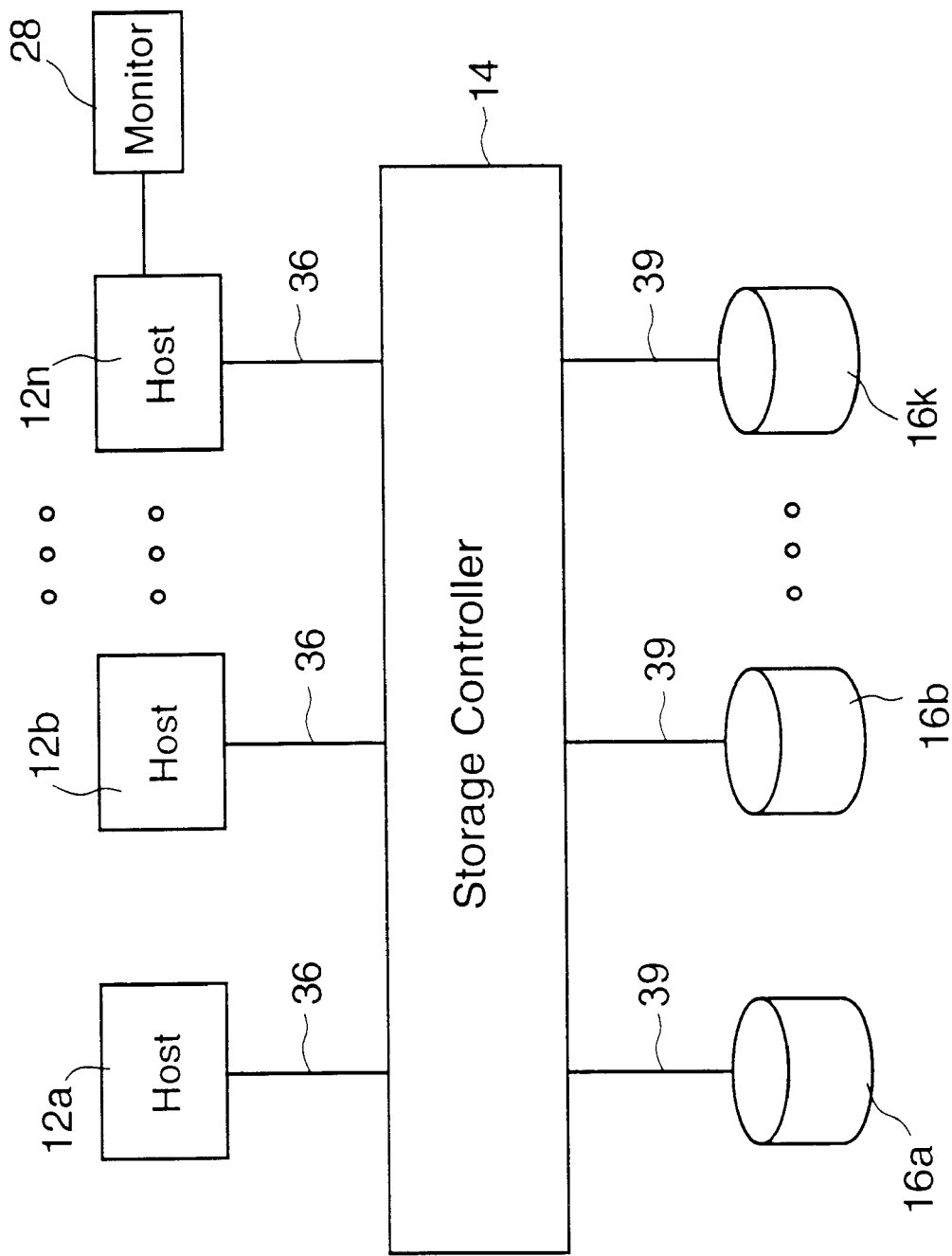
FIG. 1 is a block diagram illustrating the disk storage element/host computer system with which the invention is particularly useful.

Referring to FIG. 1, the invention relates to a computer system wherein at least one, and more likely a plurality of host computers or processors 12a, 12b, . . . , 12n, connect to a storage controller system 14, such as the EMC Symmetrix® storage system. The storage controller acts as the interface between the host computers and a plurality of mass storage devices, such as, for example, disk drive elements 16a, 16b, . . . , 16k. Data written by the host or read from the disk drive elements passes through the storage controller system which acts a two way communications path with substantial capabilities. For example, in some systems, the data from the host is uniformly striped across all of the disk storage devices; and in other systems, the data from the host is stored on the disk drives 16 according to a RAID protocol or an n-way mirrored protocol. In yet other embodiments of the invention, all of the data from a particular host may be stored in a logical volume on a single disk drive or allocated to different logical volumes of the same or different disk drives, depending upon the nature and the source of the data and host. A host computer can also read data from one or more of the disk drive units to generate a host logical volume.

When a problem arises which impairs performance of the system, for example, a decrease in throughput, the problem can arise in either the host, the storage controller, the disk drive elements, or in combinations thereof. One particular problem involves the effect of a load unbalance in the system. This problem can occur if, for example, each of the logical volumes to which a host computer or processor is directed all reside on one or a few disk drive elements. This unbalance can create a bottleneck on those communication lines connecting to the disk drive elements as well as at the disk drive elements themselves, reducing the responsiveness and throughput of the system. In order to correct this problem, it is desirable to have the logical volumes, which a host computer or processor, or a group of host computers or processors, access, spread among as diverse a plurality of disk drive elements as possible.

In accordance with the invention, a graphic user interface is provided by a host computer which enables the user to visually observe on a monitor 28, controlled by the host computer, the interrelationship between the logical volumes to which one or more host processors have access, and the disk drive elements on which those logical volumes are stored, either in a protected or an unprotected mode.

Figure 2:
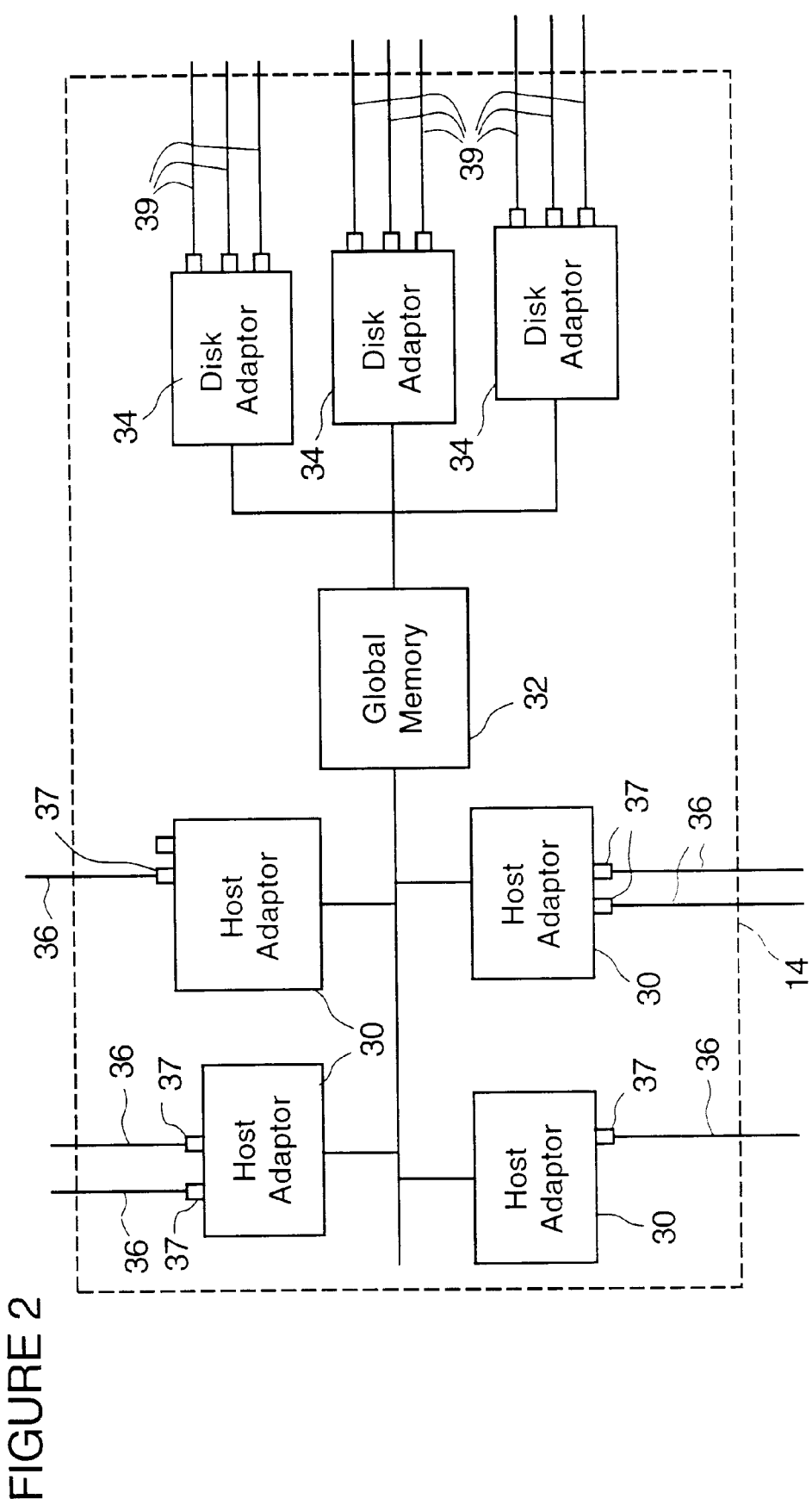
FIG. 2 is a more detailed block diagram in accordance with one embodiment of the invention.

Referring to FIG. 2, in a particular embodiment according to the invention, the storage controller, here a disk controller, has a plurality of host adaptors (also referred to as channel directors) 30 connecting to a global memory 32 through which, in this embodiment, all data and commands flow. The global memory 32 is connected to a plurality of disk adaptors (also referred to as disk directors) 34 which connect the disk drives 16 to storage or drive ports 35 of the adaptors 34 over line 39. In accordance with this particular embodiment of the invention, each host adaptor has a SCSI or other adaptor embedded therein which communicates with the global memory 32. In the illustrated embodiment, the read and write operations pass thorough each host adaptor unit 34 and to the disk adaptors to the disk drive elements. Each host adaptor connects to one or more host computers over buses 36 at host processor ports 37 of the host adaptors.

Figure 3:
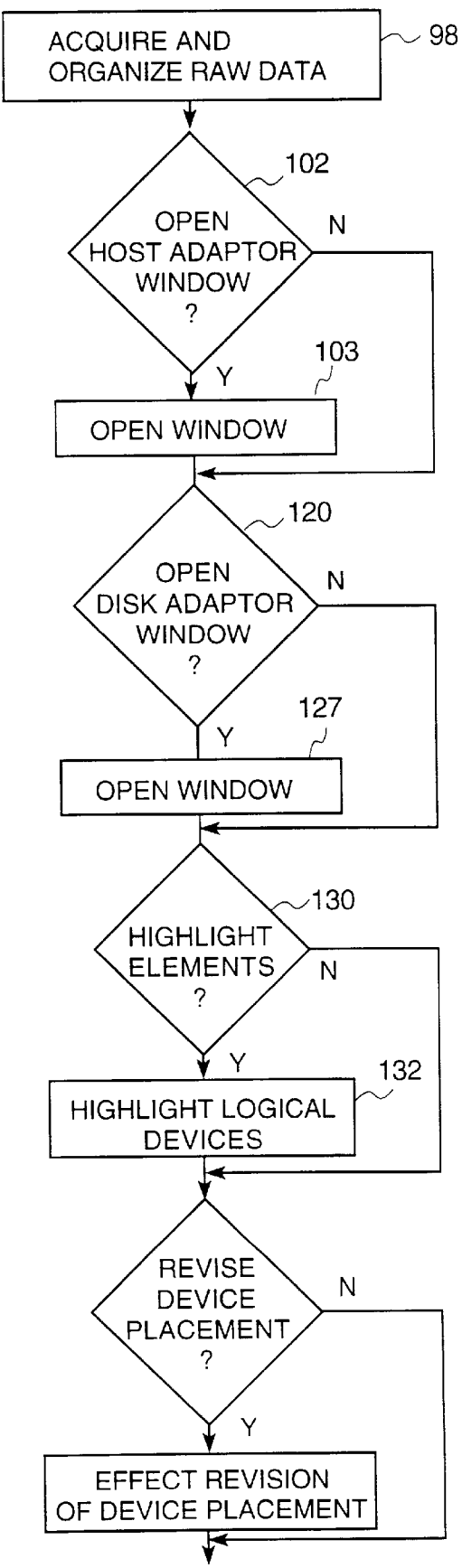
FIG. 3 is a flow chart illustrating typical operation in accordance with the invention.

Referring to FIGS. 3 and 4, a host computer, appropriately programmed, can display two views of the logical volumes accessible at the disk drive controller. The host processor can command the controller to create the raw data on-the-fly, and deliver it to the requesting host. The host computer or processor then correlates all of the raw data to yield a view of the mass storage system which can show the relationship between the host adapters, that is, the front end of the controller, and the disk adaptors, that is, the back end of the disk controller system. These views are extremely useful for effecting logical device allocation among the disk drive elements, and for maintaining a balanced load at the back end.

In accordance with the invention, the system first acquires and organizes at 98 the "raw data" required for presenting the two display views. The system then determines whether a command has been given to open a host adaptor configuration window 100. This is indicated at step 102. The host adapter window 100 presents a view of the system from the host processor side and is opened at step 103. Each horizontal row 104a, 104b, . . . , 104n provides, in this illustrated embodiment, an identification of each host adaptor port 37, and the host processor which is connected to that port. In addition, the target address number used by the host processor is identified in the top row section 106 of each row while directly beneath each target address number used by the host there appears the logical device number in bottom row section 107, used internally by the disk drive controller to identify the logical device with which the host target address number is identified. This data is retrieved from the controller by the host using request commands over communication channel 36.

The operating system program then checks, at 120, whether the disk adaptor configuration window 122 should be opened. The disk adaptor window 122 identifies for each disk adaptor port, the disk controller device numbers (corresponding to the logical volumes on the actual physical disk drive or drives connected to the port) to which that port has access. These device numbers are presented in rows 125 and are indicated at 126. The window is opened at 127. Immediately below the logical device number is an identification of the logical device type, that is, the type of protection, if any, provided for each logical device ("NP" meaning no protection, "M" followed by a number meaning mirrored protection, and "R" indicating RAID protection). Typical forms of protection include mirrored drives which can include two-way or greater mirroring, a device with no protection, and devices with RAID protection. This data is also retrieved from the controller by the host using request commands over communications channels 36. In a particular embodiment all of the "raw data" can be retrieved using a single request command.

Once these two windows have been opened, in accordance with the invention, a user can select, for example by clicking (assuming a mouse pointer has been implemented) on any logical volume or device number, for example, a logical device number in the host adaptor configuration array, to highlight that logical device number not only in the host adaptor configuration window 100 but also in the disk adaptor configuration window 122. This step is indicated at 130, 132 in FIG. 3 as is indicated in FIG. 4 by the boxes placed around logical device "18". (Device 18 is 4-way mirrored and accessed through four different disk adaptors.) The system thus highlights all equivalent logical devices, that is, the logical devices at the disk drive forming a RAID group, mirrored groups, etc.

Not only, however, can a logical device identification be highlighted, but in addition (or instead) a host computer can be selected with the result being that all logical devices accessible to the host computer are identified in the second window by highlighting. Further, this highlight identification extends across multiple host adaptor ports if the host computer is connected to multiple ports. And for each accessible logical volume, all logical devices (for example, in a RAID or mirrored group) depending upon the nature of the write protection, are highlighted. Finally, in addition to highlighting the devices, or the host computer, one or a group of ports can be selected to highlight all of the logical devices connected to the particular port or group.

In this manner, the second window identifies, for example, all of the logical devices to which a host can read or write, and if those logical devices are not reasonably spread across the disk adaptor ports, a revision of the logical device placement can be undertaken, at steps 150, 152 to better balance the system activity among disk drives thereby to reduce loading one drive too heavily, and resulting in improved and increased throughput and access times for the mass storage device. A particular procedure for revising the logical device placement is described in co-pending U.S. application Ser. No. 08/937,467, filed Sep. 25, 1997, in the names of Erez Ofer, Kenneth Halligan, and John Fitzgerald, titled METHOD AND APPARATUS FOR THE ON-LINE RECONFIGURATION OF THE LOGICAL VOLUMES OF A DATA STORAGE SYSTEM, the contents of which are incorporated herein by reference.

The data presented in the two open windows in FIG. 4 represent the view of the controller system at the host adaptor level and the disk adaptor level and, as noted above, is typically stored (in "raw data" form) in some disk controller systems, such as the EMC Symmetrix® disk storage controller. Accordingly, prior to or simultaneously with the operations illustrated in FIG. 3, the host computer accesses or will access the disk controller to obtain this stored information (as raw data). Once retrieved, the host computer operating as described herein, reorganizes and correlates the data which initially, in raw form, relates independently to each of the two views, to achieve, as is well known in the art, a correlated relationship as illustrated in FIG. 4. Thereafter, the identity of either a host computer, a port, or a logical device can be selected on one of the windows, and is appropriately highlighted as illustrated in FIG. 3. Additions, subtractions, and other modifications of the disclosed invention will be apparent to those practiced in this art, and are within the scope of the following claims.

What is claimed is:

1. A method for load balancing the access to an array of storage elements each element storing at least one logical device accessible to at least one host processor as a host logical volume through a storage element controller, comprising the steps of visually displaying in a first window portion of a host processor-controlled display monitor, a first mapping identifying for each controller host port, the logical volumes available to said port, visually displaying in a second window portion of the host processor-controlled display monitor a second mapping identifying for each controller storage port the logical devices stored in a storage element attached to said controller storage port, and highlighting in at least the second window, for any selected host port identified in the first window, all logical devices accessible from said host port.

2. The method of claim 1 further wherein said first window displaying step further displays for each host port, the identification of the host processor connected to each respective host port.

3. The method of claim 1 further wherein the controller has a plurality of host adaptors, each adaptor having a plurality of said host ports, and a plurality of storage element adaptors, each storage adaptor having a plurality of storage ports, said method further comprising the steps of visually displaying, in said first window, in association with a host port, the host adaptor containing said host port, and displaying, in said second window, in association with a storage port, the storage adaptor containing said storage port.

4. The method of claim 1 further comprising the steps of displaying, in the second window, in association with each logical device entry, a protection level for said entry.

5. The method of claim 1 further comprising the step of reassigning logical devices from one storage element to another storage element, based upon said highlighting step, to better load balance access to said storage elements.

6. A method for visually displaying the association of any of logical devices stored on an array of storage elements, each storage element storing at least one logical device accessible to at least one host processor through a storage element controller, comprising the steps of visually displaying, in a first window portion of a host processor-controlled display monitor, a first mapping identifying, for each controller host port, the logical devices available to said port, visually displaying in a second window portion of the host processor-controlled display monitor a second mapping identifying for each controller storage port the logical devices stored on a storage element attached to the controller storage port, and highlighting in at least the second window, for any selected host port identified in the first window, all logical devices accessible from said host port.

7. The method of claim 6 further wherein said first window displaying step further displays for each host port, the identification of the host processor connected to each respective host port.

8. The method of claim 6 further wherein the controller has a plurality of host adaptors, each adaptor having a plurality of said host ports, and a plurality of storage element adaptors, each storage adaptor having a plurality of storage ports, said method further comprising the steps of visually displaying, in said first window, in association with a host port, the host adaptor containing said host port, and displaying, in said second window, in association with a storage port, the storage adaptor containing said storage port.

9. The method of claim 6 further comprising the steps of displaying, in the second window, in association with each logical device entry, a protection level for said entry.

10. The method of claim 6 further comprising the step of highlighting, in said second window, any selected protection element identification for a selected logical device and all other, related, logical devices associated with the protected logical device.

* * * * *